(12) United States Patent
McNeely

(10) Patent No.: US 8,192,518 B1
(45) Date of Patent: Jun. 5, 2012

(54) FERTILIZER SYSTEM

(76) Inventor: Gerald W. McNeely, Spartanburg, SC (US)

( * ) Notice: Subject to any disclaimer, the term of this patent is extended or adjusted under 35 U.S.C. 154(b) by 0 days.

(21) Appl. No.: 12/568,383

(22) Filed: Sep. 28, 2009

Related U.S. Application Data

(60) Provisional application No. 61/101,865, filed on Oct. 1, 2008.

(51) Int. Cl.
*C05D 9/00* (2006.01)
*C05D 9/02* (2006.01)

(52) U.S. Cl. .................................. 71/1; 71/31

(58) Field of Classification Search .............. 71/1, 31, 71/48, 64.01–64.07, 64.13; 264/4.3; 424/19, 424/426, 486, 489, 405, 409, 408, 451, 497, 424/452, 456–458; 428/373, 378, 359, 361, 428/372, 393
See application file for complete search history.

(56) References Cited

U.S. PATENT DOCUMENTS

| | | | |
|---|---|---|---|
| 3,219,433 | A | 11/1965 | Brewster et al. |
| 3,850,862 | A | 11/1974 | Clendinning et al. |
| 4,016,117 | A | 4/1977 | Griffin |
| 4,218,350 | A | 8/1980 | Griffin |
| 4,324,709 | A | 4/1982 | Griffin |
| 4,686,790 | A | 8/1987 | Lahalih et al. |
| 5,091,262 | A | 2/1992 | Knott et al. |
| 5,230,959 | A * | 7/1993 | Young et al. ............ 428/372 |
| 5,451,611 | A | 9/1995 | Chilukuri et al. |
| 5,476,528 | A | 12/1995 | Trimm et al. |
| 5,672,434 | A | 9/1997 | Dalebroux et al. |
| 5,760,118 | A | 6/1998 | Sinclair et al. |
| 6,284,278 | B1 * | 9/2001 | Waldman et al. ......... 424/489 |
| 6,730,709 | B2 | 5/2004 | Itoh et al. |
| 6,844,380 | B2 | 1/2005 | Favis et al. |
| 2004/0069032 | A1 | 4/2004 | Krysiak et al. |

FOREIGN PATENT DOCUMENTS

WO   WO2009/023235   2/2009

OTHER PUBLICATIONS

Colbond, "Enkamat", <retrieved from http://www.colbond-geosynthetics.com/cms/generated/pages/products/enkamat/productfamily/1%C2%A7enkamat.html>, 1 page.
Plastics Solutions Canada Inc., "Oxo-Biodegradable Polyolefin Plastics for Commodity Applications", <retrieved from www.ecosafeplastics.com>, 2 pages.
Bio-Tec Environmental, LLC, "All About Bio-Batch", <retrieved from www.bio.tec.biz/products.html>, 2 pages.
Pine Valley Polymers Inc, "Degradable Poly", <retrived from www.pvpolymers.com/degradable.html>, 4 pages.
Garber, "On the Increase: Wastelands in the Water", U.S. News and World Report, Jun. 16, 2009, p. 26 and 29.

* cited by examiner

*Primary Examiner* — Christopher J. Novosad
(74) *Attorney, Agent, or Firm* — Neustel Law Offices

(57) ABSTRACT

A fertilizer system for the long-term fertilization of a crop through use of fertilizer pellets or mats comprised of a fertilizer and thermoplastic polymer blend. The fertilizer system generally includes forming a fertilizer containing polymer comprised of a fertilizer substance and a polymer product. The fertilizer containing polymer is buried within a growing medium and seed is planted over the fertilizer containing polymer. The polymer product within fertilizer containing polymer slowly biodegrades causing the fertilizer substance to slowly release within the growing medium and fertilize the planted seed. The fertilizer containing polymer is formed to continue to biodegrade over a period of several years during which time fertilizer substance will continue to be released. A method of forming the fertilizer containing polymer is also disclosed herein.

8 Claims, 7 Drawing Sheets

FERTILIZER SYSTEM

CROSS REFERENCE TO RELATED APPLICATIONS

I hereby claim benefit under Title 35, United States Code, Section 119(e) of U.S. provisional patent application Ser. No. 61/101,865 filed Oct. 1, 2008. The 61/101,865 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fertilizers and more specifically it relates to a fertilizer system for the long-term fertilization of a crop through use of fertilizer pellets or mats comprised of a fertilizer and thermoplastic polymer blend.

2. Description of the Related Art

Any discussion of the related art throughout the specification should in no way be considered as an admission that such related art is widely known or forms part of common general knowledge in the field.

Fertilizer products have been in use for many years and are typically used by farmers, yard owners, golf courses, along road sides, potted plants, as well as various other commercialized or residential places having vegetation. Fertilizers generally must be applied every year which can be expensive, especially for those with large areas to fertilize.

In addition, a large problem with applying fertilizer is ensuring that the fertilizer does not run-off, which has been estimated to be caused by not only irregular terrain, but also rain. Since where the rain falls cannot generally be controlled, many vegetation growers experience consistent run-off thus leading to a costly and time-consuming fertilization process every year because of the need to reapply fertilizer and the damage realized by the crops or other vegetation from the run-off fertilizer. Because of the inherent problems with the related art, there is a need for a new and improved fertilizer system for the long-term fertilization of a crop through use of fertilizer pellets or mats comprised of a fertilizer and thermoplastic polymer blend.

BRIEF SUMMARY OF THE INVENTION

A system for the long-term fertilization of a crop through use of fertilizer pellets or mats comprised of a fertilizer and thermoplastic polymer blend. The invention generally relates to a fertilizer which includes forming a fertilizer containing polymer comprised of a fertilizer substance and a polymer product. The fertilizer containing polymer is buried within a growing medium and seed is planted over the fertilizer containing polymer. The polymer product within fertilizer containing polymer slowly biodegrades causing the fertilizer substance to slowly release within the growing medium and fertilize the planted seed. The fertilizer containing polymer is formed to continue to biodegrade over a period of several years during which time fertilizer substance will continue to be released. A method of forming the fertilizer containing polymer is also disclosed herein.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Figure 1:
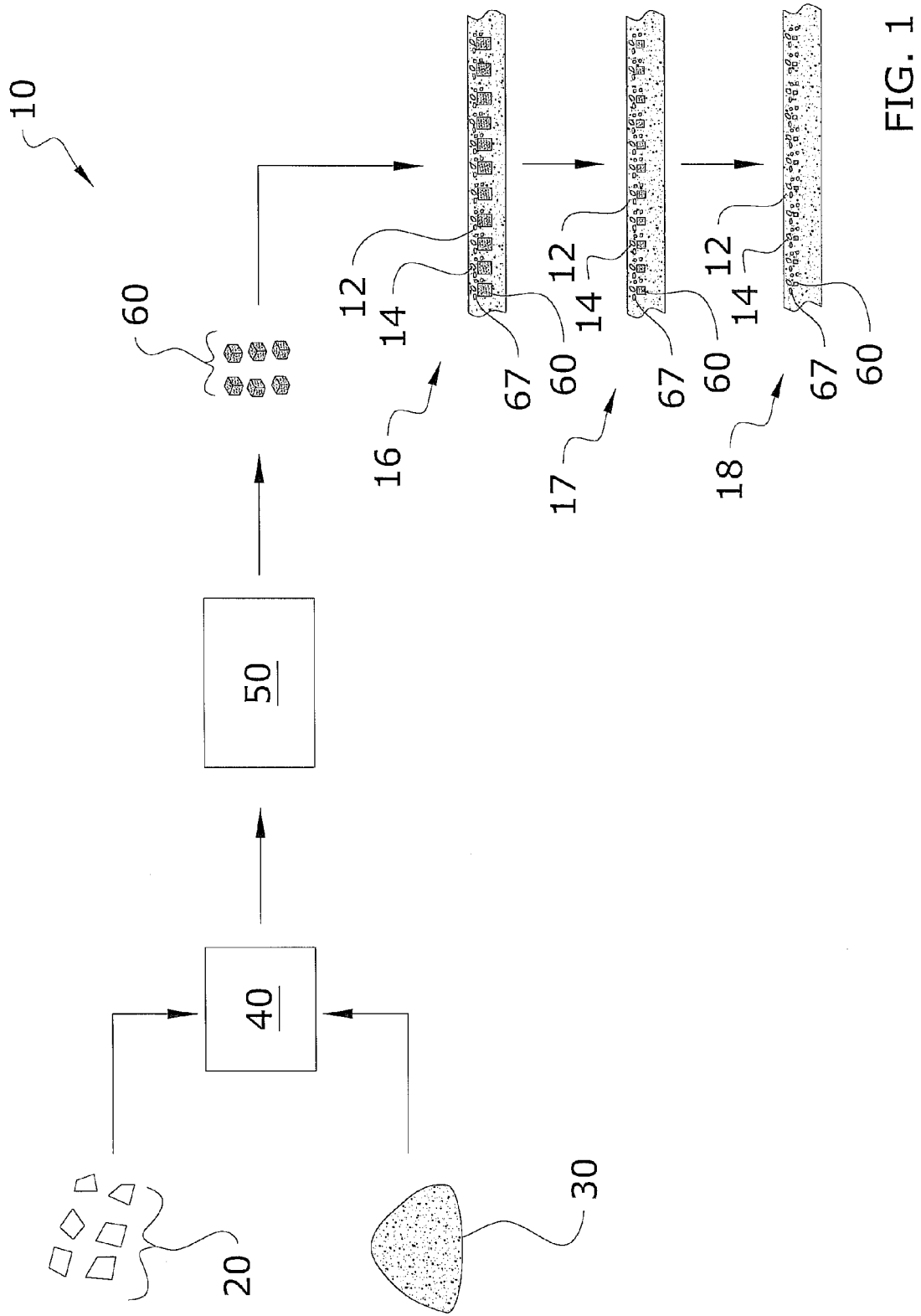
FIG. 1 is a flow diagram of a method of production and a method of use of the present invention and illustrating the fertilizer containing pellet degrading over time while continuing to release the fertilizer substance.
Figure 2:
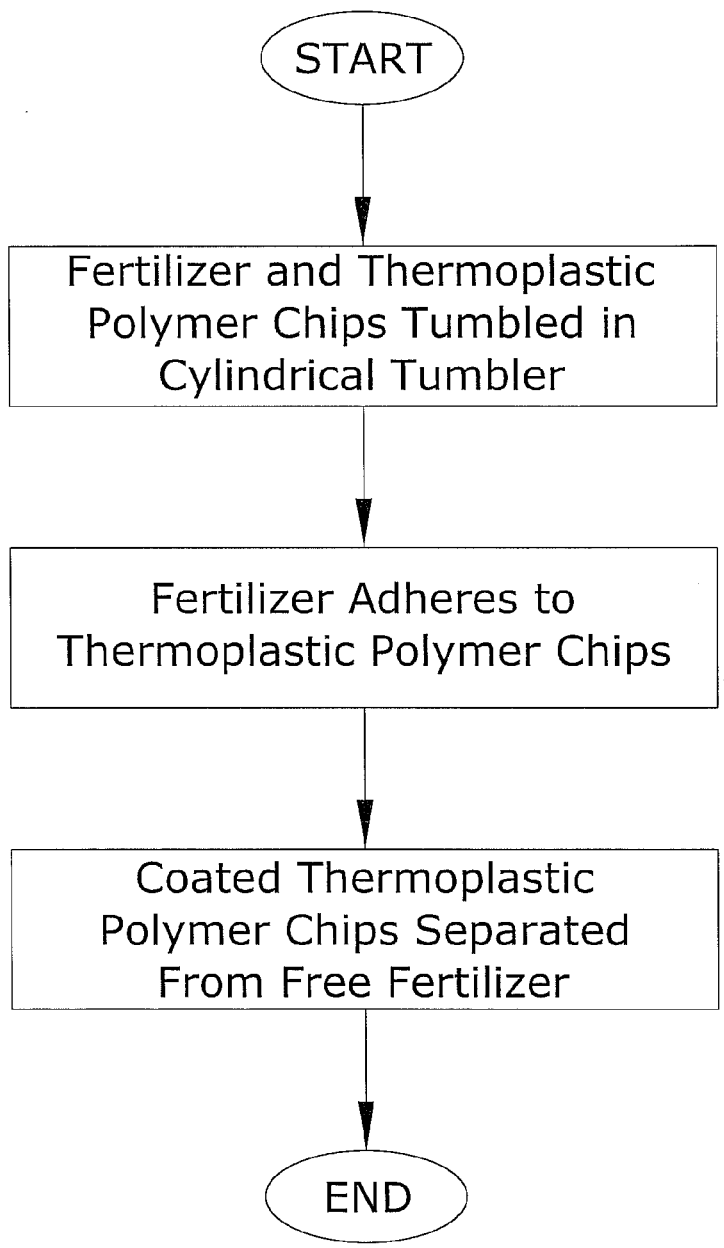
FIG. 2 is a flowchart illustrating the tumbling process of the present invention as illustrated in FIG. 1.
Figure 3:
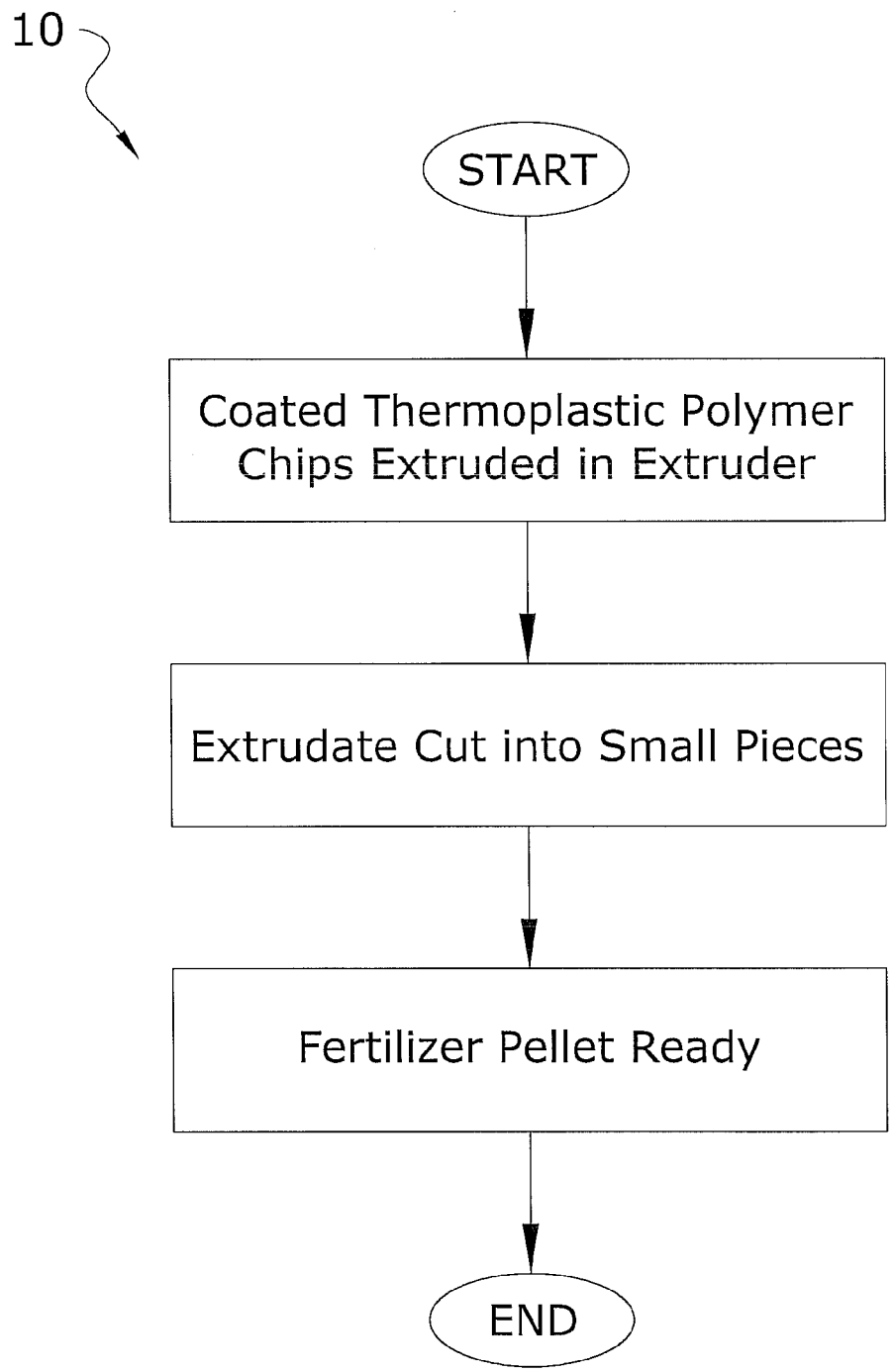
FIG. 3 is a flowchart illustrating the extruding process of the present invention as illustrated in FIG. 1.
Figure 4:
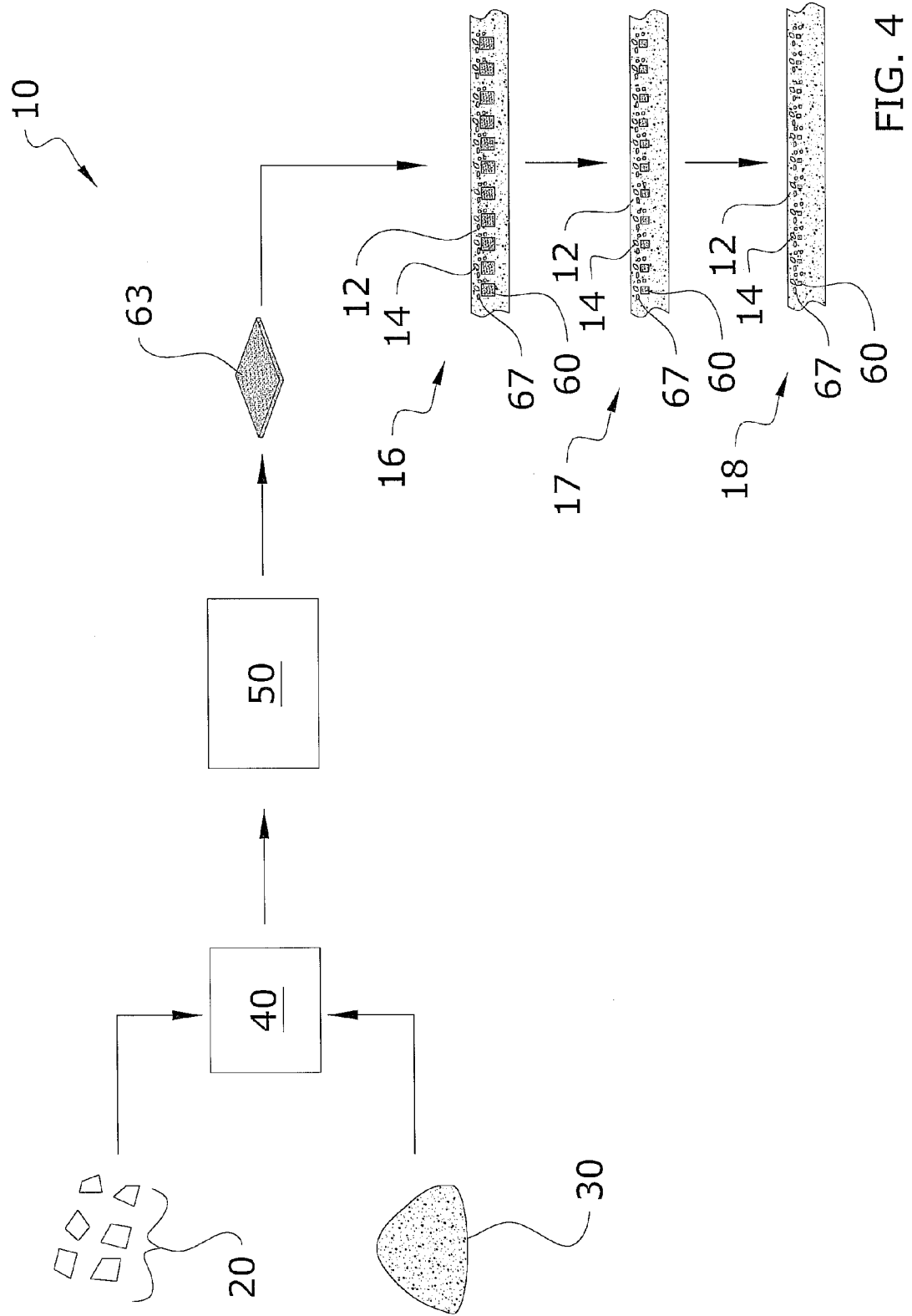
FIG. 4 is a flow diagram of a method of production and a method of use of an alternate embodiment of the present invention and illustrating the fertilizer containing mat degrading over time while continuing to release the fertilizer substance.
Figure 5:
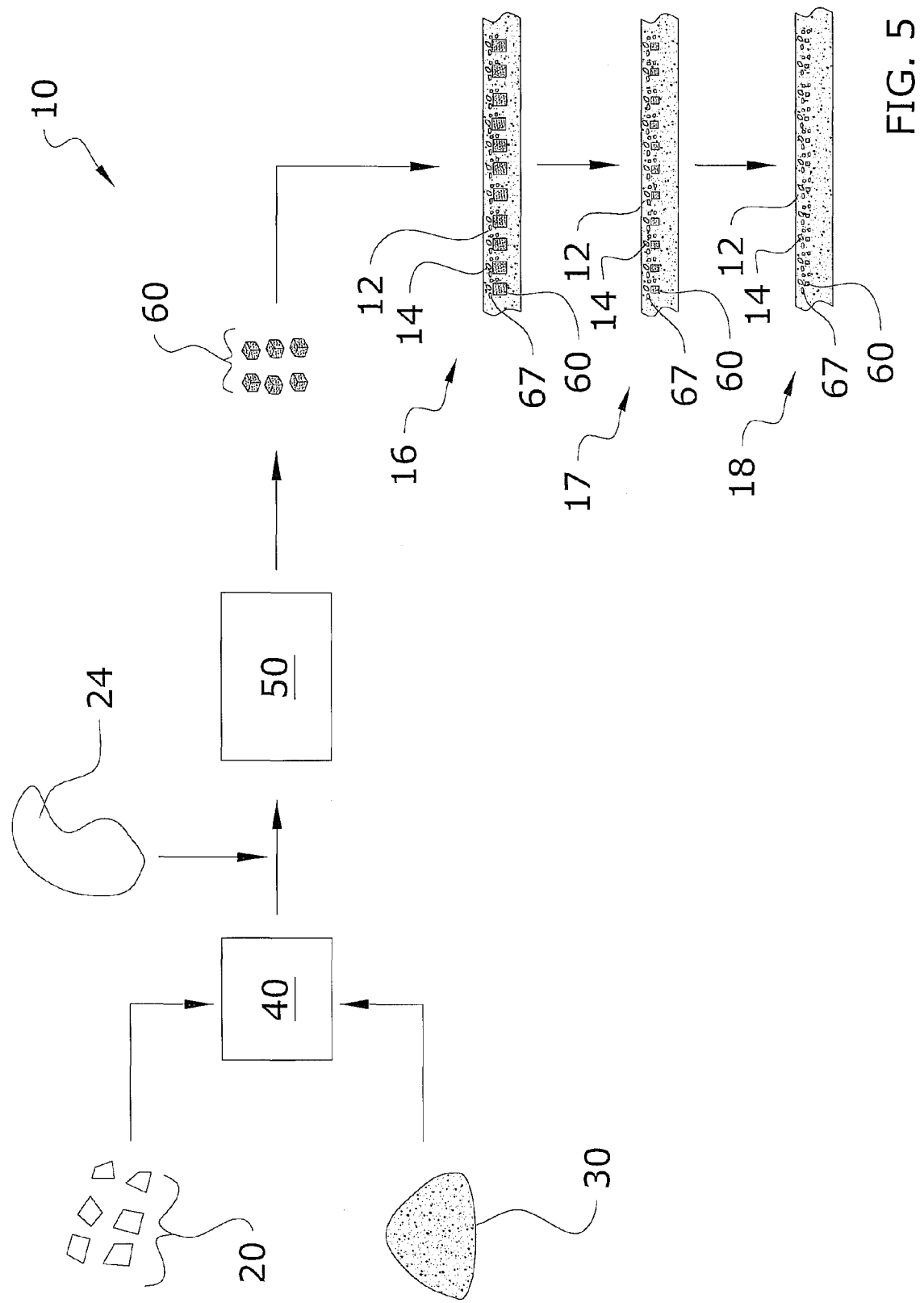
FIG. 5 is a flow diagram of an alternate method of production of the present invention illustrating a slurry being added and a method of use of the present invention.
Figure 6:
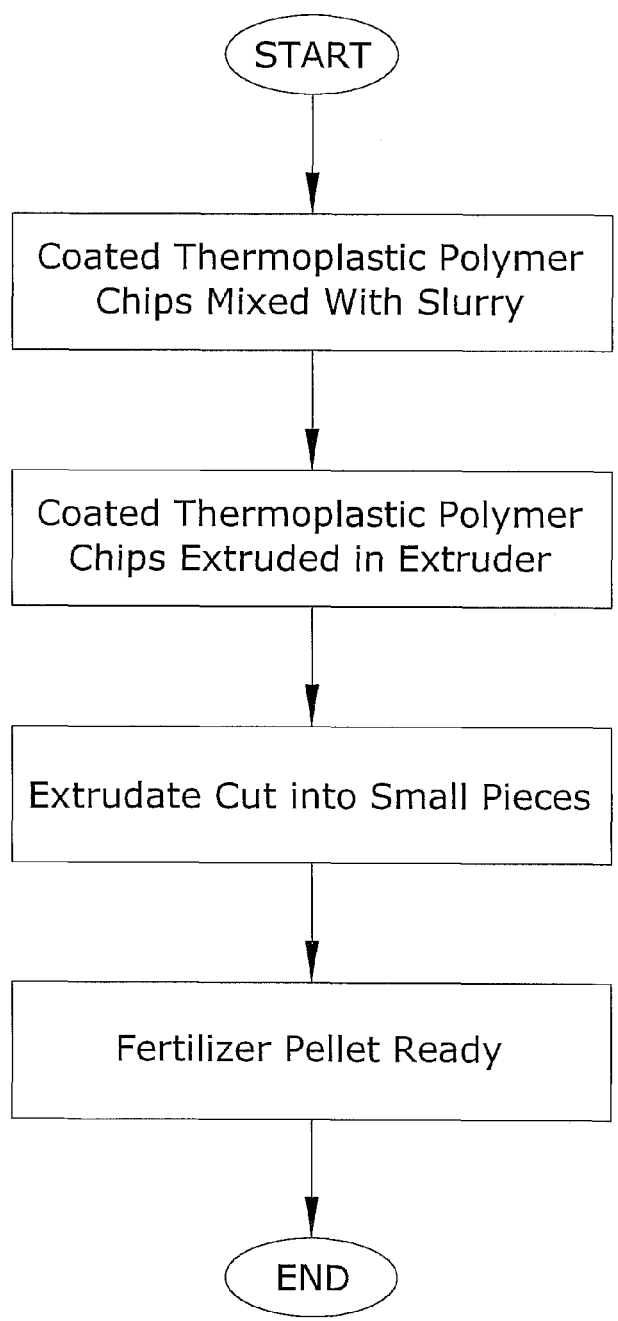
FIG. 6 is a flowchart illustrating the extruding process of the present invention as illustrated in FIG. 5.
Figure 7:
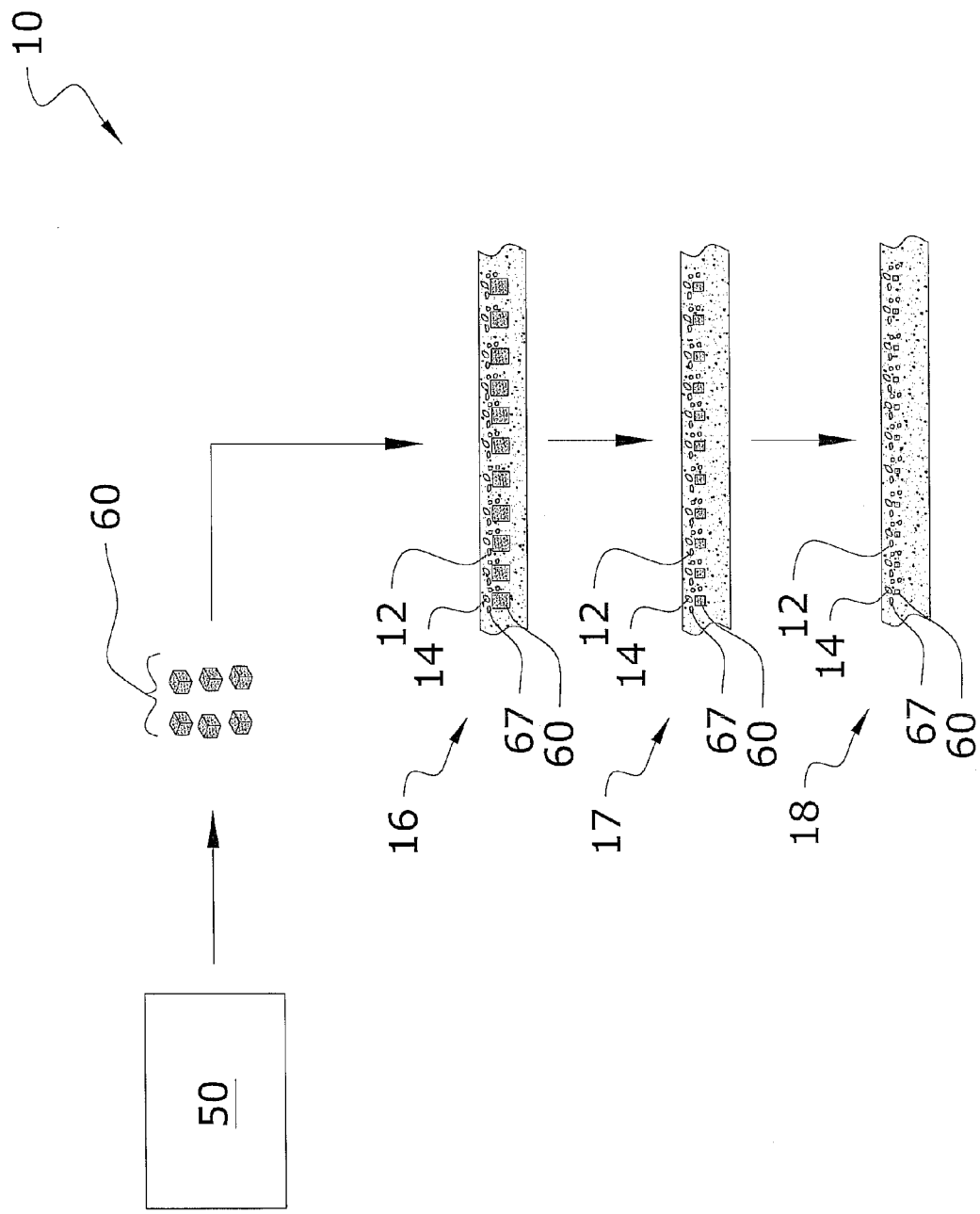
FIG. 7 is a flow diagram of an alternate method of production of the present invention illustrating the tumbler being eliminated and a method of use of the present invention.

Turning now descriptively to the drawings, in which similar reference characters denote similar elements throughout the several views, FIGS. 1 through 7 illustrate a fertilizer system 10, which comprises tumbling hydrophilic fertilizer substance 30 and thermoplastic polymer chips 20 in a cylindrical tumbler 40 and then extruding the resulting fertilizer coated thermoplastic polymer chips. The resulting extrudate 60, 62 is then generally cut into either chips, pellets, or left in a large mat form. It is appreciated that a pellet, chip, and mat structure are similar in size to conventional meanings, such as a pellet or chip 60 being small enough to hold one or more within your hand and the mat being comprised of a thin and flat structure large in surface area. The mat 62 may be comprised of a grated structure, a solid sheet structure, a flexible structure, or a rigid structure, among various other configurations.

When using the present invention, the formed fertilizer containing polymer 60, 62 comprised of a fertilizer substance 30 and a polymer product 20 is buried within a growing medium 12 and seed 14 is planted over the fertilizer containing polymer 60, 62. The polymer product 20 within fertilizer containing polymer 60, 62 slowly biodegrades causing the fertilizer substance 30 to slowly release within the growing medium 12 and fertilize the planted seed 14. The fertilizer containing polymer 60, 62 is formed to continue to biodegrade over a period of several years during which time fertilizer substance 30 will continue to be released.

B. Fertilizer.

The fertilizer component 30 of the fertilizer system 10 may be comprised of various chemicals and chemical compounds known to assist in the growth of various crops or other vegetation. Examples of fertilizers which have been successfully utilized with fertilizer system 10 include solid potassium chloride, solid calcium phosphate, solid potassium dihydrogen phosphate, and ammonium dihydrogen phosphate. The fertilizer substance 30 is preferably a hydrophilic component which causes the surface of the polymer 20 to be water wettable to aid in biodegradation of the extruded fertilizer containing polymer 60, 62.

It is appreciated that fertilizer system 10 may be used with a wide variety of fertilizers to meet the needs of the individual user. It is also appreciated that fertilizers which are undeveloped or undiscovered at the time of filing may be utilized with fertilizer system 10. Further, the fertilizer substance 30 is generally in a solid powder state, however liquid state fertilizers may be used with the present invention also.

C. Polymer Product.

The polymer product 20 which is generally comprised of a plurality of thermoplastic polymer chips may be comprised of various types of thermoplastics, including without limitation polyesters, polyamides, polyethylene and polypropylene. It is appreciated that the polymer product 20 may be comprised of recovered thermoplastics to assist in conservation. The polymer product 20 is able to decompose or biodegrade when within the soil and/or external environment. It is appreciated that various additives may be added to the polymer product 20 during the production process to aid in the biodegradation of the polymer product 20 once in the form of the fertilizer containing polymer 60, 62.

It is appreciated that fertilizer system 10 may be used with a wide variety of polymer products 20, so long as the polymer product 20 functions properly during the extruding processes utilized in creation of the present invention. It is appreciated that polymer products 20 may be comprised of various shapes and sizes. It is further appreciated that thermoplastic polymers which are undeveloped or undiscovered at the time of filing may be utilized with fertilizer system 10.

D. Production of Fertilizer System.

In a preferred embodiment of the present invention, a fertilizer 30 and thermoplastic polymer chips 20 are first tumbled in a cylindrical tumbler 40. However, it is appreciated that various shapes and sizes of tumblers may be utilized with the present invention. The ratio of fertilizer 30 to thermoplastic polymer chips 20 may be comprised of various ratios and may be varied without affecting the overall function of the invention. It is further appreciated that the fertilizer 30 and thermoplastic polymer chips 20 may be tumbled for varying amounts of time and in varying temperatures. During the process of tumbling, it is appreciated that the thermoplastic polymer 20 may increase or decrease in size and softness. Examples of a first temperature range and first time periods for the tumbling process are listed in the first example, second example, third example, and fourth example sections.

After tumbling, the cylindrical tumbler 40 will generally contain both coated thermoplastic polymer product and free fertilizer. The coated thermoplastic polymer product and free fertilizer are then separated, and the coated thermoplastic polymer product fed into an extruder 50. It is appreciated that extrusion can occur at various temperatures, though it is preferable that the coated thermoplastic polymer product be extruded at a temperature which is optimal for extrusion. The resulting extrudate is then cut into either chips, pellets 60, or in left/cut in a mat 62 form and ready for planting. Examples of a second temperature range and second time periods for the extrusion process are listed in the first example, second example, third example, and fourth example sections. It is appreciated that the remaining free fertilizer may be reused in subsequent applications.

As the fertilizer containing polymer 60, 62 of the present invention biodegrades, the fertilizer substance 30 releases and becomes free and available as a nutrient. The planted fertilizer containing polymer 60, 62 will generally contain enough fertilizer 30 for a specific number of years over which fertilization is desired. Examples include 3 to 20 years from planting of fertilizer containing polymer 60, 62. It is also appreciated that the present invention could eliminate the problem of fertilizer run-oft as minimal loss of fertilizer has been shown when chips or pellets have been subjected to water.

It is also appreciated that, in an alternate embodiment, slurry 24 may be mixed with the coated thermoplastic polymer product prior to them being fed into the extruder 50. The slurry 24 may be comprised of various compounds, but is preferably comprised of a combination of ethyl oleate and cornstarch.

It is further appreciated that, in yet another alternate embodiment, fertilizer system 10 may be comprised of mats 62 instead of chips or pellets 60. In this embodiment, thermoplastic polymer chips 20 and fertilizer 30 are tumbled and then extruded directly into mats 62. It is appreciated that the resulting mats 62 may be comprised of various shapes and/or sizes to serve each user's individual needs. The mats 62 are buried in the growing medium 12 similar to the pellets or chips 60 and function in a similar manner.

It is also appreciated that, in another alternate embodiment, an extruder 50 may be utilized in producing the present invention that includes twin screwed or mixing screws. When using this type of extruder 50, the present invention may be produced without tumbling, with the blending taking place during the extrusion stage.

It is further appreciated that the molecular weight of the thermoplastic polymer 20 may be decreased by inclusion of oxidizing agents in the extrusion stage of production of the present invention.

The following descriptions are merely examples and are not intended to limit the scope of the present invention in any way. It is appreciated that the characteristics described in the examples below may be varied in numerous ways without affecting the overall operation of the present invention.

i. First Example

In a first example, 100 grams of polyethylene chips were used as a thermoplastic polymer 20 and 60 grams of solid potassium chloride were used as a fertilizer 20. The polyethylene chips 20 and solid potassium chloride 30 were placed in a cylindrical tumbler 40 and tumbled for 5 to 15 minutes at temperatures ranging from room temperature to 150 degrees Celsius. The size of the polyethylene chips 20 increased and the chips themselves softened. The potassium chloride 30 adhered to the surface of the polyethylene chips 20.

The contents of the tumbler 40 were separated and weighed, consisting of 150 grams of coated polyethylene chips and 5 grams of free potassium chloride. The coated polyethylene chips were fed into an extruder 50 and extruded at temperatures ranging from 160 to 210 degrees Celsius.

The resulting extrudate was cut into small pieces 60, weighed and placed in boiling water for one hour. The pieces 60 were dried and weight. No weight loss was observed, but surfaces exposed by cutting showed an indication that potassium chloride 30 had been removed therefrom.

ii. Second Example

In a second example, 100 grams of polyethylene chips were used as a thermoplastic polymer 20 and 100 grams of solid calcium phosphate were used as a fertilizer 30. The polyethylene chips 20 and solid calcium phosphate 30 were placed in a cylindrical tumbler 40 and tumbled for 5 to 20 minutes at temperatures ranging from room temperature to 150 degrees Celsius. The size of the polyethylene chips 20 increased and the chips themselves softened. The calcium phosphate 30 adhered to the surface of the polyethylene chips 20.

The contents of the tumbler 40 were separated and weighed, consisting of 160 grams of coated polyethylene chips and 33 grams of free calcium phosphate. The coated polyethylene chips were fed into an extruder 50 and extruded at temperatures ranging from 160 to 210 degrees Celsius.

The resulting extrudate was cut into small pieces 60, weighed and placed in boiling water for one hour. The pieces 60 were dried and weight. No weight loss was observed, but surfaces exposed by cutting showed an indication that calcium phosphate had been removed therefrom.

iii. Third Example

In a third example, 100 grams of polyethylene regrind were used as a thermoplastic polymer 20 and 107 grams of solid potassium dihydrogen phosphate were used as a fertilizer 30. The polyethylene 20 and solid potassium dihydrogen phosphate 30 were placed in a cylindrical tumbler 40 and tumbled for 10 to 25 minutes at temperatures ranging from 50 to 175 degrees Celsius. The size of the polyethylene 20 increased and the chips themselves softened. The solid potassium dihydrogen phosphate 30 adhered to the surface of the polyethylene 20.

The contents of the tumbler 40 were separated and weighed, consisting of 196 grams of coated polyethylene and 8 grams of free potassium dihydrogen phosphate. The coated polyethylene chips were then mixed with slurry 24 containing 4 grams of ethyl oleate and 2 grams of cornstarch. The resulting mixture was fed into an extruder 50 and extruded at temperatures ranging from 160 to 210 degrees Celsius.

iv. Fourth Example

In a fourth example, 60 grams of polyethylene terephthalate regrind were used as a thermoplastic polymer 20 and 125 grams of solid potassium chloride were used as a fertilizer 30. The polyethylene terephthalate 20 and solid potassium chloride 30 were placed in a cylindrical tumbler 40 and tumbled for 15 to 20 minutes at temperatures ranging from 245 to 255 degrees Celsius. The polyethylene terephthalate softens and the potassium chloride adhered to the surface of the polyethylene terephthalate.

The contents of the tumbler 40 were separated and weighed, consisting of 104 grams of coated polyethylene terephthalate and 78 grams of free potassium chloride. The coated polyethylene terephthalate chips were fed into an extruder 50 and extruded at temperatures ranging from 250 to 280 degrees Celsius.

The resulting extrudate was cut into small pieces 60, weighed and placed in boiling water for one hour. The pieces 60 were dried and weighed. A 5% weight loss was observed, and surfaces exposed by cutting showed a strong indication that potassium chloride 30 had been removed there from.

E. Usage of Fertilizer System.

In use, the formed fertilizer containing polymer (pellets 60 or mats 62) comprised of a fertilizer substance 30 and a polymer product 20 is buried by spreading within a growing medium (e.g. soil) 12 and seed 14 is planted over the fertilizer containing polymer 60, 62. The polymer product 20 within the fertilizer containing polymer 60, 62 slowly biodegrades causing the fertilizer substance 30 to slowly release within the growing medium 12 and fertilize the planted seed 14. The fertilizer containing polymer 60, 62 is formed to continue to biodegrade over a period of several years (shown by reference numerals 16, 17, 18) during which time fertilizer substance 30 will continue to be released.

This process, along with the formation process is illustrated in FIGS. 1, 4, 5, 7, and 8. FIGS. 1, 4, 5, 7, and 8 illustrate an example of the fertilizer containing polymer 60, 62 during a first time period 16 (e.g. 1 or more years), wherein the fertilizer containing polymer is releasing fertilizer to the planted seed. Reference numeral 17 illustrates a second time period (e.g. 1 or more years) after the first time period 16 where the polymer product 20 within the fertilizer containing polymer 60, 62 is slightly biodegraded (thus smaller in size) and the fertilizer 30 is continued to be released to more planted seeds 14. Reference numeral 18 illustrates a third time period (e.g. 1 or more years) after the second time period 17 where the polymer product 20 within the fertilizer containing polymer 60, 62 is further biodegraded and the fertilizer 30 is continued to be released to more planted seeds 14.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of forming a fertilizer containing polymer that releases fertilizer into a growing medium over a period of several years, comprising:
   providing a plurality of thermoplastic polymer chips, wherein said thermoplastic polymer chips are comprised of polyethylene;
   providing a hydrophilic fertilizer substance;
   blending said plurality of thermoplastic polymer chips with said hydrophilic fertilizer substance so that said plurality of thermoplastic polymer chips are coated with said hydrophilic fertilizer substance to create a plurality of coated thermoplastic polymer chips;

mixing a slurry with said coated thermoplastic polymer chips; and extruding a fertilizer containing polymer, wherein said fertilizer containing polymer is not water-soluble, wherein said hydrophilic fertilizer substance is uniformly distributed throughout said fertilizer containing polymer.

2. The method of claim 1, wherein said blending step takes place within an extruder.

3. The method of claim 1, wherein said fertilizer containing polymer is cut to form a plurality of chips or pellets structure.

4. The method of claim 1, including a step of oxidizing said plurality of thermoplastic polymer chips during said extruding step to decrease a molecular weight.

5. The method of claim 1, wherein said slurry is comprised of a combination of ethyl oleate and cornstarch.

6. The method of claim 1, wherein said extruding step operates at a temperature range of 135 to 280 degrees Celsius.

7. The method of claim 1, wherein said slurry is comprised of ethyl oleate.

8. The method of claim 1, wherein said slurry is comprised of cornstarch.

* * * * *